Patented May 5, 1942

2,281,559

UNITED STATES PATENT OFFICE 2,281,559

UREA-HALOACYLATED UREA-ALDEHYDE CONDENSATION PRODUCTS

Gaetano F. D'Alelio, Pittsfield, Mass., assignor to General Electric Company, a corporation of New York No Drawing. Application August 9, 1939, Serial No. 289,273

13 Claims. (Cl. 260—69)

This invention relates to new condensation products and to methods of making the same. The invention is concerned more particularly with self-curing aminoplasts, by which is meant heat-convertible resinous condensation products prepared from amino or amido compounds and having the inherent characteristic of curing under heat or under heat and pressure to the insoluble, infusible state without the addition of a curing accelerator or catalyst.

In the production of aminoplasts it has heretofore been common practice in converting such materials to the insoluble, infusible state to incorporate into the condensation product or into the molding composition a latent or active (direct) curing catalyst. As pointed out more particularly hereafter, this technique and the final products have not been wholly satisfactory.

I have discovered that self-curing aminoplasts can be produced by condensing a non-haloacylated urea, an aliphatic aldehyde, for example formaldehyde, and a halogenated acylated urea (haloacylated urea) such as hereafter more particularly identified. The initial condensation may be carried out at normal or at elevated temperatures, in the presense or absence of a condensation catalyst and under alkaline, neutral or acid conditions.

The urea component (aldehyde-reactable organic compound of the urea system) may be, for instance, urea ($NH_2CONH_2$) itself; thiourea; iminourea (guanidine); aldehyde-reactable substituted ureas, thioureas and iminoureas such as methyl urea, acetyl urea, benzoyl urea, phenyl thiourea, asymmetrical diethyl urea, allyl urea, 2-chloro-allyl urea, ethylidene urea, methylol urea, methylene urea, dicyandiamide (cyanoiminourea), guanylurea, guanylthiourea, biguanidine, aminoguanidine, creatine (guanidine methyl glycine) and guanoline (guanido carbonic ethyl ester). Terms such as "a urea," "a non-haloacylated urea," "urea component" and "urea substance," as used generally herein and in the appended claims, have reference to and mean an aldehyde-reactable organic compound of the urea system, numerous examples of which have been given hereinbefore.

The halogenated acylated ureas used in practicing this invention are those in which at least one halogen atom is attached to at least one of the following carbon atoms thereof: the alpha carbon atom; the beta carbon atom. An example of such a urea is chloroacetyl-urea, $ClCH_2CONHCONH_2$. These halogenated acylated ureas are derived from a urea or urea substance as above defined. It is a requisite of these halogenated ureas that they have at least one hydrogen atom attached to a nitrogen atom in the urea grouping. As a result, they are aldehyde-reactable and for purpose of brevity are so termed hereafter and in the appended claims.

In producing the new condensation products, which may be described more specifically as co-condensation products, the choice of the aliphatic aldehyde component is dependent largely upon economic considerations and upon the particular properties desired in the finished product. I prefer to use as the aldehydic component formaldehyde or compounds engendering formaldehyde such as paraformaldehyde, hexamethylenetetramine, etc. For some applications I may use, for instance, acetaldehyde, propionaldehyde, butyraldehyde, acrolein, methacrolein, crotonaldehyde, etc., mixtures thereof, or mixtures of formaldehyde (or compounds engendering formaldehyde) with such aliphatic aldehydes. In general, the longer the chain of the aliphatic aldehyde, the slower the cure of the resinous condensation product and the softer is the final product.

In the heat-convertible resinous condensation products of this invention the self-curing property of the product is imparted thereto by creating a resin molecule having this inherent characteristic. This is a discovery of great practical significance. It makes possible the production of molding compositions of uniform curing characteristics, which compositions yield molded articles free from imperfections, such as blisters, discolorations, etc. Such imperfections are due usually to localized curing that often occurs in resinous materials of the admixed-catalyst type. As the value of the molded article, especially light-colored articles, is materially influenced by its appearance, it is clear that the discovery of any means for decreasing or eliminating entirely the production of imperfect articles which must be scrapped or sold at reduced price is of considerable commercial importance.

As a result of my invention the difficulties attendant the production of molding compositions comprising aminoplasts of the admixed-catalyst type are avoided. With such compositions there was, despite the most careful precautions, considerable variation in the curing rates of the individual batches. This made difficult the maintenance of production schedules. Considerable variation also was common even among different portions of the same batch of material, as evidenced by the appearance of the cured article.

The resin syrups and molding compositions of this invention may be stored for long periods of time without material alteration. In marked contrast therewith the prior heat-convertible aminoplasts, more particularly those containing direct or active curing catalysts such as acids, for example hydrochloric, ethyl sulfuric, phthalic, chloroacetic, phosphoric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be produced rapidly and economically. The cured products have good light stability, excellent water resistance and surface finish and in general meet the strength, hardness and other requirements of the particular service application.

In carrying the present invention into effect the condensation reaction between the aliphatic aldehyde and the other components preferably is started under neutral or alkaline conditions. Neutral conditions may be established by neutralizing (if necessary) either the mixed components or the individual component or components prior to admixture. Any substance yielding an alkaline aqueous solution may be used in obtaining alkaline conditions for the initial condensation reaction. In some cases it may be desirable, in order more quickly to initiate reaction between the starting materials, to add a small amount of a suitable organic or inorganic acid. Thereafter the solution is treated to eliminate acidic conditions due to acid or acid salts. That is, the mass is neutralized or is made alkaline by adding an alkaline substance. The reaction is then caused to proceed further to produce the self-curing aminoplasts of this invention.

In obtaining the neutral, alkaline or acid conditions above described I may use, for example, ammonia, sodium hydroxide or carbonate, calcium hydroxide, methyl amine, diethyl amine, tri-isopropyl amine, ethanol amines, tri-isopropanol amine, etc., mixtures of such alkaline substances, inorganic or organic acids such as hydrochloric, sulfuric, phosphoric, acetic, acrylic, crotonic, malonic, etc., or acid salts such as sodium acid sulfate, monosodium phosphate, monosodium phthalate, etc., or mixtures of acids, of acid salts, or of acids and acid salts. Sodium hydroxide and carbonate and calcium hydroxide are examples of fixed alkalies (alkaline substances).

Various ways may be employed for effecting initial reaction between the components. For example, I may first mix all the reactants and effect condensation between the mixed reactants in the presence or absence of addition agents, as for instance, condensation catalysts, fillers, plasticizers, other natural or synthetic resinous bodies, solvents, or diluents, etc. Alternatively, I may add the halogenated acylated urea to a partial condensation product or a urea and an aliphatic aldehyde and effect further condensation between the components. Or, I may first condense the halogenated acylated urea with aliphatic aldehyde, add the resulting product to a urea-aliphatic aldehyde partial condensation product and then cause the reaction to proceed further. Or, I may condense or partially condense a halogenated acylated urea with a mole excess of an aliphatic aldehyde, add a urea to this condensation product and effect further reaction between the components. Still other ways may be employed in combining the components and in producing the unmodified or modified condensation products of this invention, as will be readily understood by those skilled in the art as the description of the invention proceeds. These condensation reactions may proceed under a wide variety of time, temperature and pressure conditions. The temperature of reaction may vary from room temperature to the reflux temperature of the reactants at reduced, atmospheric or superatmospheric pressures.

The products obtained as described above properly may be designated as intermediate condensation products. They are heat-convertible resinous bodies which alone or mixed with fillers, pigments, dyes, lubricants, plasticizers, etc., may be used, for example, as molding compositions. The modified or unmodified resinous masses are self-convertible under heat or under heat and pressure to the insoluble infusible state.

Depending upon the particular reactants employed and the particular conditions of reaction, the intermediate condensation products vary from clear, colorless, syrupy, water-soluble liquids to viscous, milky dispersons and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositions of adjusted viscosity and concentration. The liquid compositions may be used, for instance, as surface coating materials, in the production of paints, varnishes, lacquers, enamels, etc., for general adhesive applications, as anti-creasing agents, in producing laminated articles, and for numerous other purposes. The liquid intermediate condensation products also may be used directly as casting resins. Those intermediate products of a gel-like nature may be dried and granulated to form clear, unfilled, heat-convertible resins.

In order that those skilled in the art better may understand how this invention may be carried into exect, the following examples are given by way of illustration:

*Example 1*

| | Parts by weight |
|---|---|
| Urea | 60.0 |
| Aqueous ammonia (28%) | 7.6 |
| Aqueous formaldehyde (37.1% approximately) | *161.0 |
| Sodium hydroxide (in 1 part water) | 0.04 |
| Chloroacetyl - urea (monochloroacetyl-urea) | 1.0 |

*Approx. 60 parts HCHO.

The above components with the exception of the chloroacetyl-urea were mixed and refluxed for 20 to 30 minutes. The resulting resin syrup was allowed to cool and the above stated amount of chloroacetyl-urea added thereto. Sixty-one (61) parts alpha flock and 0.4 part zinc stearate were added to form a molding composition. The compound was heated at 50° C. to effect further condensation simultaneously with drying. When the compound was dry, molded articles of good appearance and good color were produced therefrom by molding under heat and pressure.

*Example 2*

Same formulation as in Example 1. All the components except the halogenated acetyl urea, specifically chloroacetyl-urea, were mixed and refluxed for 20 to 30 minutes. Then the chloroacetyl-urea was added to the partial condensation product and the mass refluxed for an additional 10 minutes. The clear hot syrup was mixed with alpha flock and zinc stearate as described in Example 1 to form a molding composition. The compound thus prepared was dried at 50° C. Molded articles formed from the dried composition under heat and pressure had good characteristics.

Example 3

Same formulation as in Example 1 except that 0.5 part chloroacetyl-urea was used. All of the components were mixed and the mass heated under reflux for 2 minutes. The clear hot syrup was mixed with 70 parts alpha flock and 0.5 part zinc stearate to form a molding composition. The compound was dried at 50° C. Articles molded at 130° C. under pressure had good cure and other desirable characteristics.

Example 4

Same formulation as in Example 1 except that 1 part chloroacetyl-ethyl-hydantoate, $ClCH_2CONHCONHCH_2COOC_2H_5$ was used instead of the chloroacetyl-urea. All of the components except the chloroacetyl-ethyl-hydantoate were mixed and the mass heated under reflux for 20 to 30 minutes. The syrup was

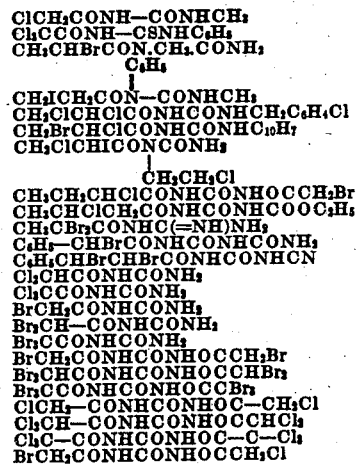
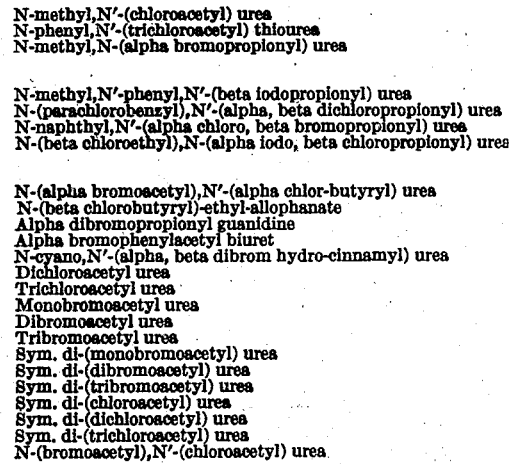

allowed to cool and the above stated amount of chloroacetyl-ethyl-hydantoate was added thereto. Alpha flock and zinc stearate were added and the compound heated at 50° C. to effect simultaneous drying and further condensation. The compound was then shaped and hardened under heat and pressure to form molded articles of good characteristics, being outstanding in lightness of color.

To a part of the compound was added 0.25% titanium dioxide and a small amount of blue dye. Molded articles from this compound had excellent color.

Example 5

Same formulation as in Example 1 except that 1 part chloroacetyl-ethyl-hydantoate was used instead of the chloroacetyl-urea. All of the components except the chloroacetyl-ethyl-hydantoate were mixed and heated under reflux for 20 to 30 minutes. The above stated amount of chloroacetyl-ethyl-hydantoate was added and the mass refluxed for 10 minutes to effect further condensation. The clear hot syrup was mixed with alpha flock and zinc stearate to form a molding composition. The compound was dried at 50° C. Molded articles similar to those of Example 4 were obtained by the application of heat and pressure.

Example 6

Same formulation as in Example 1 except that 0.5 part chloroacetyl-ethyl-hydantoate was used instead of the chloroacetyl-urea. All of the components were mixed and the mass heated under reflux for 4½ minutes. The hot syrup was mixed with alpha flock and zinc stearate to form a molding composition. The compound was dried at 50° C. for approximately 4 hours. When molded under heat and pressure articles with good characteristics were obtained.

Condensation products of urea and formaldehyde alone, prepared as described under Examples 1 to 6, inclusive, but not intercondensed with the specific halogenated acylatedureas mentioned in the individual example are heat-non-convertible. In other words, they will not cure under heat or under heat and pressure to the insoluble infusible state.

It will be understood, of course, that the aldehyde-reactable halogenated acylated ureas mentioned in the above examples are only by way of illustration and that any other aldehyde-reactable halogenated acylated urea may be used in carrying this invention into effect. Additional examples of such halogenated ureas are:

It also will be understood that in each of the specific halogenated acylated ureas above mentioned the particular halogen shown in any specific formula may be replaced by some other halogen, care being taken in the choice of the halogen in the light of the properties desired in the final products. For example, when light-colored molded articles are desired, the use of iodo derivatives should be avoided and when the heat-convertible resins are to be used in the production of molding compositions, the fluoro derivatives preferably are avoided.

Where a plurality of halogen atoms are present in the halogenated acylated urea, these may be the same or different. For example, one halogen in the molecule may be chlorine and another bromine. In this way it is possible to obtain a heat-convertible resin of self-curing characteristics and other properties best adapted to meet a particular molding problem and service application of the finished article.

In certain cases, it may be advantageous to use a single halogenated acylated urea with a plurality of non-haloacylated ureas. Thus, to modify the characteristics of the molded product I may use a mixture of, for example, urea and dicyandiamide, with a single halogenated acylated urea. In other cases, instead of using a single halogenated acylated urea, I may use a plurality of halogenated acylated ureas with a single non-haloacylated urea substance or with a plurality of non-haloacylated ureas.

The ratio of the reactants to each other may be considerably varied, but in general, it is desirable to use at least one mole of an aliphatic aldehyde for each mole of the non-haloacylated urea. In producing the heat-convertible resinous condensation products of this invention, the proportion of halogenated acylated urea in all cases is at least sufficient to impart self-curing characteristics to the resin. Ordinarily a small amount not exceeding substantially ¼ mole halogenated acylated urea is used for each mole of the non-haloacylated urea. No advantage accrues from using an amount of halogenated acylated urea above the minimum required to secure the desired curing rate. Further, the use of higher amounts of halogenated acylated urea is undesirable for most molding applications because of the greater difficulty in obtaining molded articles of suitable hardness, but may not be objectionable for other applications of the material. Also, in some cases, particularly where high molecular weight halogenated acylated ureas, as for example N-(alpha chlorostearyl) urea, are used, the halogenated acylated urea part of the resin molecule exceeds on a weight basis the urea portion of the molecule. Consequently, in such cases the inherent characteristics (for example, waxy nature) of the high molecular weight halogenated acylated urea predominate in the resin molecule. This may be objectionable in some applications of the molded part, for example where resistance to the ordinary organic solvents is required.

From the foregoing it will be seen that the particular mole ratio of halogenated acylated urea to the other components is dependent somewhat upon the inherent characteristics of the halogenated acylated urea and the curing characteristics and other properties desired in the heat-convertible and heat-hardened resinous condensation products. Thus, in producing these new condensation products I may cause to react ingredients comprising essentially (1) a non-haloacylated urea (specifically the organic compound corresponding to the formula $NH_2CONH_2$), (2) an aliphatic aldehyde, e. g., formaldehyde and (3) a halogenated acylated urea in which at least one halogen atom is attached to the alpha carbon atom, the beta carbon atom or to both the alpha and beta carbon atoms, e. g., a chlorinated acetyl urea. For molding applications the ratio of the aliphatic aldehyde to urea substance may be considerably varied, but generally will be within the range of 1½ to 2½ moles aliphatic aldehyde for each mole of urea substance. No particular advantage ordinarily accrues from the use of higher amounts of aldehyde. Approximately 2 moles aliphatic aldehyde per mole urea substance usually gives very satisfactory results, particularly from the viewpoint of optimum yields of condensation product per unit cost.

The fundamental resins of this invention may be varied widely by introducing other modifying bodies before, during, or after effecting condensation between the primary components. Thus, as modifying agents I may use, for example, monohydric alcohols such as ethyl, propyl, isopropyl, butyl, amyl, etc., alcohols; polyhydric alcohols such as ethylene glycol, diethylene glycol, glycerine, pentaerythritol, trimethylol nitro methane, etc.; monoamides such as formamide, acetamide, stearamide, etc.; acrylic acid amides (acryloamides), benzamide, tolune sulfonamide, etc.; polyamides such as adipic diamide, phthalamide and the like; amines such as ethylene diamine, aniline, phenylene diamine, amino phenols, etc.

The modifying bodies also may take the form of high molecular weight bodies, with or without resinous characteristics, for example hydrolyzed wood products, lignin, proteins, protein-aldehyde condensation products, furfural condensation products, phenol-aldehyde condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc., polyvinyl compounds such as polyvinyl alcohol, polyvinyl acetate, polyvinyl acetals, specifically polyvinyl formal, synthetic linear condensation products such as the superpolyamides, etc.

Other modifying agents of a plasticizing or softening nature also may be incorporated with the condensation products of this invention. Examples of such modifying agents are the phthalate esters, for instance dimethyl phthalate, diethyl phthalate, dibutyl phthalate, etc., the phosphate esters such as tricresyl phosphate, triphenyl phosphate, etc.

Dyes, pigments and opacifiers (e. g., barium sulfate, zinc sulfide, titanium compounds such as the oxides, flaked aluminum, copper and the like) may be incorporated into the compositions to alter the visual appearance and the optical properties of the finished product. Mold lubricants such as the metallic soaps of the high molecular weight fatty acids, for example the stearates and palmitates of tin, zinc, etc., waxes such as carnauba, high melting point paraffin waxes, etc., may be added to facilitate molding of the compositions. Various fillers may be used to provide a wide variety of molding compositions. The choice of the filler depends upon the particular application for which the molded article is to be used. As fillers may be used, for instance, bleached or unbleached wood flour, alpha cellulose in flock form, sheets or cuttings of paper, cloth, canvas, etc., asbestos in powdered or long or short fiber length, powdered or flaked mica, wood chips, short or long wood fibers, synthetic or natural continuous threaded fibers, glass fibers in continuous filament or fabric (woven or felted) form, etc.

In the preparation of molding compositions from the resinous bodies of this invention, the non-dehydrated or the partially dehydrated resins may be compounded with the above addition agents in accordance with procedures well known to those skilled in the plastics art. The wet composition may be dried in the usual manner either at normal (room) temperature or at elevated temperatures in a preheated stream of air or under the influence of reflected heat energy. The dried compound may be densified through the usual processes of working in a Banbury mixer, or by rolling, pelleting or other means, followed by grinding and screening to the desired particle size. These molding compositions may be molded at elevated temperatures, preferably between 100° and 150° C., and at suitable pressures. The molding pressures generally range between about 1000 and about 4000 pounds per square inch, more particularly from about 2000 to 3000 pounds per square inch.

In addition to their use in molding compositions, the condensation products of this invention are especially suitable for use as fire retardants, water repellents and sizings when applied to wood or the like, or to fibrous materials such as silk, cotton, wool, synthetic organic fibers, etc., in continuous filament, thread, fabric or other form. It will be understood, of course, that optimum resistance to water, fire, solvents, etc., is obtained only when the applied coating or sizing is converted to the insoluble infusible (cured) state. The cellulosic or other fibrous materials to be treated may be surface coated or both coated and impregnated by any suitable means, for example by spraying with, or immersing in, a solution of the treating agent and thereafter removing the solvent.

The modified or unmodified products of this invention have a wide variety of other uses, for instance in making buttons, clock cases, radio cabinets, dishes and other household utensils, decorative novelties and various other cast, molded and laminated articles of manufacture. They may be used in making arc-extinguishing tubes capable of evolving an arc-extinguishing gas under the heat of the arc, in the production of wire or baking enamels, and for bonding or cementing together mica flakes to form a laminated mica article. They also may be used in making laminated fibrous sheet materials wherein superposed layers of cloth, paper, etc., are firmly bonded together with the resin, as impregnants for electrical coils and other electrical devices, and for other purposes.

What I claim as new and desire to secure by Letters Patent of the United States, is:

1. A composition of matter comprising the heat-hardenable condensation product of ingredients comprising essentially the following components: (1) a non-haloacylated urea, (2) an aliphatic aldehyde and (3) an aldehyde-reactable halogenated acylated urea in which at least one halogen atom is attached to at least one of the following carbon atoms thereof: the alpha carbon atom; the beta carbon atom.

2. A composition of matter comprising an alcohol-modified, heat-hardenable condensation product of ingredients comprising essentially the following components: (1) a non-haloacylated urea, (2) an aliphatic aldehyde and (3) an aldehyde-reactable halogenated acylated urea in which at least one halogen atom is attached to at least one of the following carbon atoms thereof: the alpha carbon atom; the beta carbon atom.

3. A heat-curable resinous condensation product of ingredients comprising essentially the following components: (1) a non-halogenated urea, (2) formaldehyde and (3) an aldehyde-reactable halogenated acylated urea in which at least one halogen atom is attached to at least one of the following carbon atoms thereof: (a) the alpha carbon atom, (b) the beta carbon atom, the proportion of the said halogenated acylated urea being sufficient to yield a heat-curable resinous condensation product.

4. A heat-curable resinous composition comprising a soluble, fusible condensation product of ingredients comprising essentially the following components in the stated molar ratios: (1) 1 mole of urea, (2) at least 1 mole of formaldehyde and (3) a small amount not exceeding substantially ¼ mole of an aldehyde-reactable halogenated acylated urea in which at least one halogen atom is attached to at least one of the following carbon atoms thereof: the alpha carbon atom; the beta carbon atom.

5. A product comprising the cured resinous condensation product of claim 3.

6. A condensation product of ingredients comprising essentially the following components: (1) a non-haloacylated urea, (2) an aliphatic aldehyde and (3) halogenated acetyl urea.

7. The method of producing a heat-hardenable resinous composition which comprises reacting to resin formation ingredients comprising essentially the following components in the stated molar ratios: (1) 1 mole of non-haloacylated urea, (2) at least 1 mole of an aliphatic aldehyde and (3) a small amount not exceeding substantially ¼ mole of an aldehyde-reactable halogenated acylated urea in which at least one halogen atom is attached to at least one of the following carbon atoms thereof: the alpha carbon atom; the beta carbon atom.

8. A composition comprising the resinous reaction product of (1) the partial condensation product obtained by reaction, under alkaline conditions, of a mixture comprising urea and formaldehyde in the ratio of one mole of the former to at least one mole of the latter and (2) a chlorinated acetyl urea in a small molar amount not exceeding substantially one-fourth mole.

9. The heat-curable reaction product of (1) the partial condensation product obtained by reaction, while admixed with an alkaline substance comprising ammonia, of ingredients comprising essentially urea and formaldehyde in the ratio of one mole of the former to from one and one-half to two and one-half moles of the latter and (2) a chlorinated acetyl urea in a small molar amount not exceeding substantially one-fourth mole.

10. A product comprising the heat-cured reaction product of claim 9.

11. A composition comprising the product of reaction of (1) the partial condensation product obtained by reaction, in the presence of alkaline substances comprising ammonia and sodium hydroxide, of urea and formaldehyde in the ratio of one mole of the former to from one and one-half to two and one-half moles of the latter and (2) monochloracetyl urea in a small molar amount not exceeding substantially one-fourth mole.

12. The method which comprises effecting partial reaction between ingredients comprising essentially urea and formaldehyde in the ratio of one mole of the former to at least one mole of the latter and while admixed with an alkaline substance comprising ammonia, adding to the resulting partial condensation product a chlorinated acetyl urea in a small molar amount not exceeding substantially one-fourth mole, and causing the said chlorinated acetyl urea to intercondense with the said partial condensation product.

13. The method which comprises effecting partial reaction between urea and formaldehyde in the ratio of one mole of the former to from one and one-half to two and one-half moles of the latter and under alkaline conditions due to the presence of both ammonia and sodium hydroxide, adding to the resulting partial condensation product monochloracetyl urea in a small molar amount not exceeding substantially one-fourth mole, and causing the said monochloracetyl urea to intercondense with the said partial condensation product.

GAETANO F. D'ALELIO.

CERTIFICATE OF CORRECTION.

Patent No. 2,281,559. May 5, 1942.

GAETANO F. D'ALELIO.

It is hereby certified that error appears in the printed specification of the above numbered patent requiring correction as follows: Page 5, first column, line 54, claim 3, for "non-halogenated" read --non-haloacylated--; and that the said Letters Patent should be read with this correction therein that the same may conform to the record of the case in the Patent Office.

Signed and sealed this 16th day of June, A. D. 1942.

(Seal)

Henry Van Arsdale,
Acting Commissioner of Patents.